(12) United States Patent
Lean et al.

(10) Patent No.: US 6,777,500 B2
(45) Date of Patent: Aug. 17, 2004

(54) CORE-SHELL POLYMER PARTICLES

(75) Inventors: John Thomas Lean, Akron, OH (US); Eric Sean Castner, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/334,574

(22) Filed: Dec. 31, 2002

(65) Prior Publication Data

US 2004/0127603 A1 Jul. 1, 2004

(51) Int. Cl.$^7$ .............. C08L 9/06; C08L 53/02; C08F 279/00
(52) U.S. Cl. ............ 525/316; 525/69; 525/332.2; 525/332.9; 525/333.3; 525/902; 523/201
(58) Field of Search ............ 525/316, 69, 332.2, 525/332.9, 333.3, 902, 98; 523/201

(56) References Cited

U.S. PATENT DOCUMENTS 6,437,050 B1   8/2002   Krom et al.

OTHER PUBLICATIONS

Synthesis of lattices with polystyrene cores and poly (vinyl acetate) shells. Written by Christopher J. Ferguson Gregory T. Russell, and Robert G. Gilbert and published by Elsevier Science Ltd., Aug. 2002.

*Primary Examiner*—James J. Seidleck
*Assistant Examiner*—Olga Asinovsky
(74) *Attorney, Agent, or Firm*—Brouse McDowell; Roger D. Emerson; Daniel A. Thomson

(57) ABSTRACT

A core-shell particle for use as filler in rubber compositions. In one embodiment, the particle comprises a crosslinked core having repeat aromatic vinyl units. During an emulsion polymerization, a crosslinked shell comprising of conjugated diene units is grafted onto the core through residual vinyl units. The polymeric shell provides for better interaction and dispersion of the styrene core in an otherwise immiscible polymer matrix, particularly diene-based polymers. In another embodiment, the core has repeat units of (i) about 0% to about 25% by weight of a conjugated diene unit, (ii) about 70% to about 85% by weight of an aromatic vinyl unit, and (iii) about 15% to about 30% by weight of a crosslinking monomer unit.

23 Claims, 1 Drawing Sheet

CORE-SHELL POLYMER PARTICLES

BACKGROUND OF THE INVENTION

The present invention relates to core-shell polymer nano-particles and method for preparing them. The particles can include a crosslinked core and a crosslinked shell, where the shell is grafted to the core through linkage with residual unsaturation carried in the core. The core-shell polymer nano-particles provide a controlled structure, size, and morphology which are useful in composite materials, such as for example, as fillers in elastomeric polymers.

Incorporation of particles as fillers in rubber compositions is common, especially in the tire arts. The fillers are chosen to enhance certain characteristics of the rubber composition. The use of fillers, such as carbon black, silica, and crosslinked polymers, is well known. The addition of fillers tends to improve the physical properties of the polymer matrices to which they are added. Some specific physical properties that are improved by the addition of fillers are tensile strength and wear.

U.S. Pat. Nos. 5,395,891 and 6,127,488 to Obrecht disclose the use of crosslinked polybutadiene and crosslinked styrene-butadiene copolymers respectively as fillers. The purported benefits of the inclusion of these crosslinked polymer particles is lower hysteresis while the polybutadiene gels also impart improved abrasion resistance and the styrene-butadiene copolymer gels offer improve wet traction. U.S. Pat. Nos. 6,133,364; 6,207,757; and 6,242,534 to Obrecht et al. disclose a rubber composition comprising a crosslinked elastomer particle and a non-crosslinked elastomer. The crosslinked elastomeric particles are functionalized to impart unique surface reactivity for improved coupling with the non-crosslinked host elastomer as well as the subsequent ability to employ coupling agents other than the conventional sulfur-bridged bis-alkoxy silanes. The benefits of the gels are reported to be lower hysteresis, improved abrasion resistance, and improved wet traction.

U.S Patent Applications published as US 2002/0007011 and US 2001/0053813 to Konno et al. disclose a rubber composition comprising as essential components a crosslinked polymer particle and a non-crosslinked rubber component. The rubber composition may be used to obtain a vulcanized rubber. The crosslinked polymer particles are intended for use as filler to provide a rubber composition having good processability and handling performance as well as improved tensile strength and wearing resistance when vulcanized. However, it has been found that the particles disclosed in the Konno et al. application tend to soften at higher service temperatures. The effectiveness of the particles as reinforcing fillers is therefore decreased.

Core-shell morphologies from polybutadiene-polystyrene graft copolymers are taught by U.S. Pat. Nos. 6,248,419 and 6,489,378 to Sosa et al. But, the teaching is directed to production of high impact polystyrene using graft copolymer particles having a polystyrene core occluded inside a polybutadiene shell and the particles have an average particle size of about 0.5 microns.

Nano-particles are currently receiving significant interest as fillers in rubber compositions. Such combinations often provide dimensions and physical properties that differ from those of the bulk material. The use of nano-particles as fillers is thought to be advantageous because the discrete particles may be more easily and better dispersed in the polymer matrix. The higher surface to volume ratio of the nano-particles provides more opportunities for chemical and physical interactions with the polymer matrix. For example, U.S. Pat. No. 6,437,050 to Krom et al teaches a polymer nano-particle composition wherein the core is a poly (alkenylbenzene) and the surface layer includes a poly (conjugated diene) and wherein the particles are made by a dispersion polymerization process. The particles disclosed in the Krom patent are described as having core-shell morphology, but it is believed that the consensus would describe the particles as star block copolymers, as is discussed and taught in "Synthesis and Properties of Block Copolymers. 3. Polystyrene Polydiene Star Block Copolymers," Bi, L.; Fetters, l.j.; Macromolecules, 1976, Vol.9, No.5, pg. 732–742. Each of these processes uses a solvent polymerization technique.

Nano-particles have also been made using seeded emulsion polymerization technique. Ferguson et al, Polymer magazine, Vol. 43, Issue 24 (November 2002), pages 6371–6382 discloses a process in which particles containing a polystyrene core may be synthesized with a poly(vinyl acetate) shell by emulsion polymerization without secondary particle nucleation. Ferguson et al focuses on the synthesis of particles with diameters of about 400 nm and only briefly discusses the synthesis of polymer particles with diameters less than 100 nm. Ferguson et al teaches that the emulsion polymerization technique used may produce polystyrene core/poly(vinyl acetate) shell polymer particles where most of the seed particles have diameters of more than 200 nm and reported effort apparently is to achieve particles with diameter of more than 200 nm.

SUMMARY OF THE INVENTION

The present invention is the result of the discovery that polymer particles with a core-shell morphology can be prepared from aromatic vinyl monomers and conjugated diene monomers by an emulsion polymerization technique, and the resulting core-shell polymer nano-particles provide a controlled structure, size, and morphology which are very useful, for example, as fillers in elastomeric polymers to enhance their properties. The particles can make compatible two otherwise immiscible polymers by coating one of the polymers (as the core) in a polymeric shell. The shell is miscible with the polymer matrix, or host polymer, in which the particles are ultimately dispersed.

The core and the shell can be varied depending upon the desired properties and use of the particles. The core can be a soft or hard polymeric composition. The core can be a crosslinked polymer having a crosslinked shell. The shell can be grafted onto the core through linkage with residual unreacted vinyl groups carried in the core. The volume fraction of the core and shell can be varied depending upon the desired final properties of the particles. The shell composition can be chosen to provide compatibility with the matrix composition. The core-shell particle can comprise a crosslinked polymer core where the crosslinked polymer core has a predetermined $T_g$ such that the crosslinked polymer core does not soften at service temperatures up to about 150° C.

The particles are synthesized by an emulsion polymerization which can be a batch, semi-batch, or seeded continuous process, but which provides excellent control of the polymer composition and morphology. The process produces particles having a mean average diameter of less than 200 nm, preferably less than about 100 nm. The core-shell particles are useful as a filler in polymer compositions and the particles of the present invention provide enhanced properties for the polymer compositions.

DETAILED DESCRIPTION OF THE INVENTION

Figure 1:
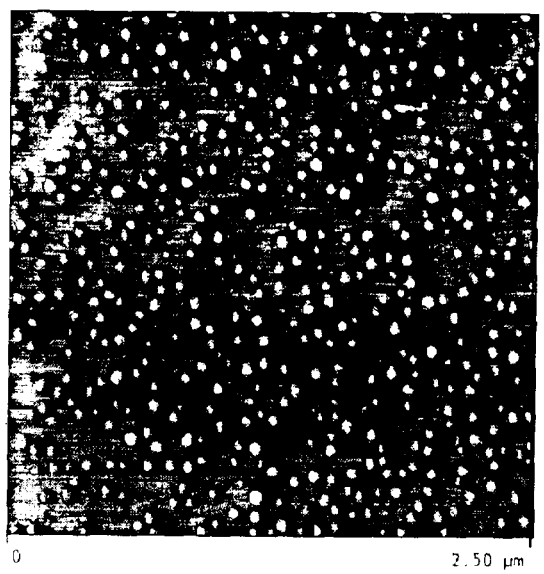
FIG. 1 is an atomic force microscope image in tapping mode of the core-shell particles of the present invention.

In the present invention, polymer particles with a core-shell morphology are prepared from aromatic vinyl monomers and conjugated diene monomers by an emulsion polymerization technique. The resulting core-shell polymer nano-particles provide a controlled structure, size, and morphology which are very useful in composite materials, such as for example, as fillers in elastomeric polymers to enhance their properties. The particles have a generally spherical morphology, which could be described as a 'golf ball shaped" in that they are more rounded and layered, as contrasted to the "star shaped" particles produced by hydrocarbon solvent polymerization processes. The particles can be a crosslinked or uncrosslinked core and a crosslinked or uncrosslinked shell, and the shell can be grafted to the core through linkage with residual unsaturation, such as carried in the core.

The core can be polymerized from aromatic vinyl units or alkenylbenzene units, conjugated diene units, or combinations of both aromatic vinyl units and conjugated diene units. The units selected and their resulting polymers allow for the tailoring of the core based on the properties of the polymer made. A core made from units that result in a polymer with a low $T_g$ will result in a soft core and a core made from units that result in a polymer with a high $T_g$ will result in a hard core. The core polymer, optionally, can be crosslinked. By crosslinking the polymer, a harder core and higher temperature stability is achieved. The aromatic vinyl units can be chosen from styrene, 2-methylstyrene, 3-methylstyrene, 4-methylstyrene, α-methyl styrene, 2,4-dimethylstyrene, 2,4-diisopropylstyrene, 4-tert-butylstyrene, tert-butoxystyrene, and the like, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons. The conjugated diene units can be chosen from any emulsion polymerizable conjugated diene including 1,3-butadiene, 2,3-dimethyl-1,3-butadiene, isoprene, methacrylate, methyl methacrylate, vinylchloride, and acrylonitrile. The conjugated diene units are present in an amount of about 0% to about 100% by weight based upon the weight of the polymer, while the aromatic vinyl units are present in an amount of about 0% to 100% by weight, preferably about 75% to about 100% by weight, based upon the weight of the polymer.

The core can be crosslinked using a crosslinking monomer unit such as divinyl benzene, diisopropenylbenzene, divinylether, triallyl cyanurate, triallyl isocyanurate, 1,2-polybutadiene, ethyleneglycol dimethacrylate, propyleneglycol dimethacrylate, 1,4-butanediol dimethacrylate, 1,6-hexanediol dimethacrylate, trimethylolpropane dimethacrylate, or trimethylolpropane trimethacrylate. The crosslinking monomer is present in an amount of from 0% to about 30%, preferably about 15% to about 30%, by weight based upon the weight of the polymer. Crosslinking the core can increase the hardness of the core, as well as enhance the uniformity and permanence of the shape and size of the resultant nano-particle.

The crosslinked shell can be 100% of a conjugated diene unit such as 1,3-butadiene, 2,3-dimethyl-1,3-butadiene or isoprene, or could be a copolymer of conjugated diene units, aromatic vinyl units, such as SBR, which is a random emulsion polymer typically containing 23.5% by weight of styrene and 76.5% by weight of butadiene, and ethylenically unsaturated monomers having functional groups able to interact with at least one functional group of the polymer. The shell is achieved by polymerizing the conjugated diene and optionally ethylenically unsaturated monomers and/or the aromatic vinyl units in the presence of the core particles.

The polymeric particle of the present invention will have a diameter of about less than about 200 nm, with particles in the range of less than about 50 nm to 240 nm being preferred, and sizes of less than 100 nm being further preferred. The particles are considered to be spherical, although shape is not critical and shape defects are acceptable, provided the nano-particles retain their discrete nature.

The method of forming a polymeric particles in accordance with the present invention involves the emulsion polymerization of the monomers and includes the steps of:

(a) polymerizing aromatic vinyl units, alone or in combination with conjugated diene units, and optionally a crosslinking monomer, to create a polymeric core having residual vinyl groups and an outer surface;

(b) polymerizing a monomer of a conjugated diene unit, alone or in combination with aromatic vinyl units, and optionally in the presence of the crosslinking monomer units, to create a polymeric shell, preferably wherein the polymeric shell is grafted to the outer surface of the polymeric core through linking butadiene of the polymeric shell with the residual unsaturation of the butadiene of the polymeric core.

By this process, it is possible to create a crosslinked polymeric shell wherein the polymeric shell is grafted to the polymeric core through linking polymer units of the polymeric shell with the residual unsaturation of the polymeric core. Thus, the process will produce nano-particles having a poly(alkenylbenzene) core having a surface layer of poly (conjugated diene) and a mean average diameter of less than about 100 nm.

The core-shell polymer particles can be recovered separately as a reinforcing filler and blended into the matrix polymer or as a latex which is blended with a latex rubber.

The core-shell polymer particles are carried in a non-crosslinked host or matrix polymer where the non-crosslinked host polymer can be a polymer having only conjugated diene repeat units, a polymer having repeat units of a conjugated diene unit and an aromatic vinyl unit, a polymer having repeat units of a conjugated diene unit and an α-β-unsaturated nitrile unit, an acrylic rubber, a polymer having repeat units of an ethylene unit, and polymers having repeat units having functional groups able to interact with at least one functional group of the core-shell polymer particles. Thus, the particles of the present invention are suitable for incorporation in and modifying a variety of rubbers, including, but not limited to, random styrene/butadiene copolymers, butadiene rubber, poly(isoprene), nitrile rubber, polyurethane, butyl rubber, EPDM, and the like.

A composition incorporating the core-shell particles of the present invention might include the following:

(a) at least about 70 phr, preferably from about 70 phr to about 95 phr, of a matrix polymer comprising about 20% to 30%, preferably 23.5%, styrene and about 70% to about 80%, preferably 76.5%, butadiene; and, (b) at least about 10 phr, preferably from about 10 phr to about 60 phr, of filler particles.

This invention is illustrated by the following examples that are merely for the purpose of illustration and are not to be regarded as limiting the scope of the invention or the manner in which it can be practiced. Unless specifically indicated otherwise, parts and percentages are given by weight.

Preparation of Core-Shell Particles
Polystyrene/Polybutadlene Core/Polybutadiene Shell with 50 wt % Core and 50 wt % Shell In a preferred embodiment of the invention, the core-shell particles consist of a 95% styrene/5% butadiene crosslinked core with a 100% butadiene shell grafted to the surface of the core through the residual vinyl groups of the butadiene in the core. The butadiene shell should provide better interaction and dispersion of the styrene core in diene-based polymers leading to improved compounding properties.

A glass quart bottle with a rubber septum and Teflon liner was charged with a soap solution composed of 423.80 g of reverse osmosis (RO) water, 0.58 g or tripotassium phosphate, 65.25 g of a 10% solution of C14–18 unsaturated fatty acid potassium salt, 5.44 g of a 20% solution of the potassium salt of disproportionated rosin acid, 1.19 g of a 47.5% active dispersion of sodium naphthalenesulfonate-formaldehyde. The pH of the soap solution was adjusted to 10.5–11.0 with a 20% potassium hydroxide solution.

To the bottle was added 10.13 g of an activator solution composed of 10 g RO water, 0.10 g hydroxymethane-sulfinic acid monosodium salt dihydrate, and 0.03 g ethylenediaminetetraacetic acid, ferric sodium complex.

237.50 g of styrene were then added to the bottle and the mixture was purged with nitrogen gas for 3 minutes to remove oxygen. 12.50 g of butadiene were added and the bottle was sealed. The sealed bottle was placed in a 23 C water bath and rotated at 20 revolutions per minute. When the contents of the bottle reached bath temperature, 0.23 g of a 44% active pinane hydroperoxide was added. The reaction was allowed to proceed until the solids content reached a plateau of 32% solids. The particle size was determined by light scattering and fit to a Gaussian distribution. The particle sizes determined were; Intensity Weight average 71±14 nm, Volume Weight average 64±13 nm, and Number Weight average 56±11 nm.

A glass quart bottle with a rubber septum and Teflon liner was charged with 233 g of the 32% 95% polystyrene/5% polybutadiene latex from above, 467 g RO Water, and 10.13 g of an activator solution composed of 10 g RO water, 0.10 g hydroxyrnethane-sulfinic acid monosodium salt dihydrate, and 0.03 g ethylenediaminetetraacetic acid, ferric sodium complex. The mixture was purged with nitrogen gas for 3 minutes to remove oxygen. 75 g of butadiene were added and the bottle was sealed. The sealed bottle was placed in a 23 C water bath and rotated at 20 revolutions per minute. When the contents of the bottle reached bath temperature, 0.23 g of a 44% active pinane hydroperoxide was added. The reaction was allowed to proceed until the solids content reached a plateau of about 19% solids. The particle size was determined by light scattering and fit to a Gaussian distribution. The particle sizes determined were; Intensity Weight average 87±7 nm, Volume Weight average 81±7 nm, and Number Weight average 80±7 nm.

The coagulation and isolation of the polymer particles were performed by first adding 4 g of a 40% active Winstay-C emulsion for oxidative stability. A coagulation solution was prepared by adding 15 g NaCl to 5 lbs RO water. The pH of the solution was lowered to between 3 and 4 with an 18% sulfuric acid solution. The latex was slowly added to the coagulation solution under rapid stirring. During the addition of latex, the pH was maintained between 3 and 4. After coagulation the crumb polymer was washed 3 times with RO water and placed in a 15 F oven for 18 hours to dry.

TABLE 1

| Example | Description |
| --- | --- |
| 1 | 0 phr CS Particle/100 phr SBR |
| 2 | 10 phr CS Particle/95 phr SBR |
| 3 | 20 phr CS Particle/90 phr SBR |
| 4 | 40 phr CS Particle/80 phr SBR |
| 5 | 60 phr CS Particle/70 phr SBR |
| 6 | 30 phr C Particle/100 phr SBR |
| 7 | 30 phr C Particle/70 phr SBR/30 phr Emulsion BR |
| 8 | 70 phr SBR/ 30 phr Emulsion BR |

Note: SBR is a random emulsion polymer containing about 23.5% styrene and 76.5% butadiene.

Table 1 lists the compositions of the compounds made. A series of compounds were made containing 0 phr–60 phr Core-shell (CS) in examples 1 to 5 to evaluate the correlation between an increase in CS particle content and material properties, along with three controls, namely examples 6 through 8. The CS Particle was treated as 50% non-reactive to sulfur cure polystyrene and 50% reactive to sulfur cure polybutadiene so that each composition was considered to contain 100 parts rubber and the amount of curatives used were adjusted accordingly.

Example 6 is a composition that contains only the polystyrene core of the CS Particle to determine the properties of the compound without the polybutadiene shell. Example 7 contains the polystyrene core and an emulsion BR to represent the polybutadiene shell of the CS Particle. Example 8 contains only the emulsion BR representing the polybutadiene shell of the CS Particle without the polystyrene core.

The controls are meant to show the polystyrene core and the polybutadiene shell do not result in the same final compound properties when they are compounded alone as they do when they are compounded as the CS Particle. The attachment of the polystyrene core to the polybutadiene shell in the CS Particle leads to a synergistic enhancement of the interactions between the non-crosslinked polymer matrix and the filler particle.

ingredients, and the second half of the Non-productive. The ram was lowered and the material was mixed for 3 minutes with the temperature not to exceed 115° C.

After the Productive mix was completed, the samples were passed six times endwise through a mill set at 0.032 in. in order to create a sheet.

RPA TEST

TABLE 2

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Non-Productive |  |  |  |  |  |  |  |  |
| SBR (phr) | 100 | 95 | 90 | 80 | 70 | 100 | 70 | 70 |
| CS Particle (phr) | 0 | 10 | 20 | 40 | 60 | 0 | 0 | 0 |
| C Particle (phr) | 0 | 0 | 0 | 0 | 0 | 30 | 30 | 0 |
| EBR (phr) | 0 | 0 | 0 | 0 | 0 | 0 | 30 | 30 |
| Zinc Oxide (phr) | 3 | 3 | 3 | 3 | 3 | 3 | 3 | 3 |
| Steric acid (phr) | 1 | 1 | 1 | 1 | 1 | 1 | 1 | 1 |
| Total (phr) | 104 | 109 | 114 | 124 | 134 | 134 | 134 | 104 |
| Productive |  |  |  |  |  |  |  |  |
| Non-Productive | 104 | 109 | 114 | 124 | 134 | 134 | 134 | 104 |
| Sulfur | 1.75 | 1.75 | 1.75 | 1.75 | 1.75 | 1.75 | 1.75 | 1.75 |
| Santocure NS | 1 | 1 | 1 | 1 | 1 | 1 | 1 | 1 |
| TBBS accelerator |  |  |  |  |  |  |  |  |
| Total (phr) | 106.75 | 111.75 | 116.75 | 126.75 | 136.75 | 136.75 | 136.75 | 106.75 |

* Non-productive is the compounded material without any curative agents added. The material may be heated and mixed to higher temperatures without beginning the vulcanization process. Productive is the non-productive material with the curative added. The material may now be cured (vulcanized) with heat.

Mixing Protocol

Mixing of the resin/polymer blends was accomplished in two stages. The first stage (Non-productive) involved adding half of the resin/polymer blend to a 55 cc Haake Rheomix 90 equipped with a throat, with all the temperature control zones set at 145° C., Banbury rotors, and a mixing rate of 50 rpm. After the first half of the blend is added to the mixer the other ingredients of the Non-productive are added. As soon as the Non-productive ingredients were added, the second half of the blend was added in order to clear the throat of any remaining material. The ram was lowered and the material was mixed for 6 minutes ensuring that the temperature did not exceed 170° C.

The productive mix was run under the same conditions except that the temperature zones of the mixer were controlled at 100° C. One-half of the mixed Non-productive material was added to the mixer followed by the productive The compounds were milled to provide a sheet of the material. Approximately 5 g (5.1±0.1 g.) of the compound were cut from the sheet. The test is divided up into four subtests. The first subtest was conducted at 100° C. with a 2% strain deformation at 0.333 Hz and 3.33 Hz. The second subtest was also made at 100° C. and employed a 15% strain at 0.833 and 8.33 Hz. The third subtest is a cure at 191° C. for a run time of 4.88 minutes. The cure curve is generated for a strain of 3.5% at a frequency of 1.667 Hz. Subtest 4 is a strain sweep (1.0%, 5.0%, 10.0%, 15.0%, and 50.0%) at 100° C. and 1.0 Hz.

TABLE 3

| RPA 505 | Ex. 1 | Ex. 2 | Ex. 3 | Ex. 4 | Ex. 5 | Ex. 6 | Ex. 7 | Ex. 8 |
|---|---|---|---|---|---|---|---|---|
| G' @ 15% Strain (0.833 Hz) - kPa | 84.2 | 94.4 | 109.9 | 138.7 | 170.0 | 97.2 | 110.0 | 72.9 |
| G' @ 10% Strain (1 Hz) - kPa | 479.1 | 490.4 | 494.5 | 495.3 | 509.3 | 409.1 | 699.8 | 355.8 |
| Tan δ @ 10% Strain (1 Hz) | 0.063 | 0.068 | 0.073 | 0.086 | 0.095 | 0.125 | 0.214 | 0.127 |
| Ratio of G' @ 50%/G' @ 1% Strain | 0.968 | 0.985 | 0.986 | 0.988 | 0.979 | 1.016 | 0.945 | 0.992 |

Table 3 shows the G' for the compounds at 15% strain and 10% strain along with the tan δ values at 10% strain. As the data indicate, the G' values increase as the amount of CS Particles are increased showing that the polymer particles are behaving as a filler. The data also show that there is a synergistic effect by having the core and shell particle together as one unit rather than as separate entities. It is also clear that the core alone does not perform as well as the CS Particle.

Polystyrene/Divinyl Benzene Core/Polybutadiene Shell with 18 wt % Core and 82 wt % Shell In a preferred embodiment of the invention, the core-shell particles consist of a 85% styrene/15% divinyl benzene crosslinked core with a 100% butadiene shell grafted to the surface of the core through the residual vinyl groups of the divinyl benzene in the core. The butadiene shell should provide better interaction and dispersion of the styrene core in diene-based polymers leading to improved compounding properties.

A glass quart bottle with a rubber septum and Teflon liner was charged with a soap solution composed of 423.80 g of reverse osmosis (RO) water, 0.58 g or tripotassium phosphate, 65.25 g of a 10% solution of C14–18 unsaturated fatty acid potassium salt, 5.44 g of a 20% solution of the potassium salt of disproportionated rosin acid, 1.19 g of a 47.5% active dispersion of sodium naphthalenesulfonate-formaldehyde. The pH of the soap solution was adjusted to 10.5–11.0 with a 20% potassium hydroxide solution.

To the bottle was added 10.10 g of an activator solution composed of 10 g RO water, 0.10 g hydroxymethane-sulfinic acid monosodium salt dihydrate, and 0.03 g ethylenediaminetetraacetic acid, ferric sodium complex.

181.82 g of styrene and 68.18 g of 55% divinyl benzene were then added to the bottle and the mixture was purged with nitrogen gas for 3 minutes to remove oxygen. The bottle was sealed. The sealed bottle was placed in a 10 C water bath and rotated at 20 revolutions per minute. When the contents of the bottle reached bath temperature, 0.23 g of a 44% active pinane hydroperoxide was added. The reaction was allowed to proceed until the solids content reached a plateau of 28% solids. The particle size was determined by light scattering and fit to a Gaussian distribution. The particle sizes determined were; Intensity Weight average 67±14 nm, Volume Weight average 60±12 nm, and Number Weight average 53±11 nm.

A glass quart bottle with a rubber septum and Teflon liner was charged with 76.4 g of the 28% 85% polystyrene/15% divinyl benzene latex from above, 416.6 g RO Water, and 10.13 g of an activator solution composed of 10 g RO water, 0.10 g hydroxymethane-sulfinic acid monosodium salt dihydrate, and 0.03 g ethylenediaminetetraacetic acid, ferric sodium complex. The mixture was purged with nitrogen gas for 5 minutes to remove oxygen. 207 g of butadiene was added and the bottle was sealed. The sealed bottle was placed in a 10 C water bath and rotated at 20 revolutions per minute. When the contents of the bottle reached bath temperature, 0.23 g of a 44% active pinane hydroperoxide was added. The reaction was allowed to proceed until the solids content reached a plateau of about 18% solids. The particle size was determined by light scattering and fit to a Gaussian distribution. The particle sizes determined were; Intensity Weight average 100±6 nm, Volume Weight average 99±6 nm, and Number Weight average 99±6 nm.

The coagulation and isolation of the polymer particles were performed by first adding 4 g of a 40% active Winstay-C emulsion for oxidative stability. A coagulation solution was prepared by adding 15 g NaCl to 5 lbs RO water. The pH of the solution was lowered to between 3 and 4 with an 18% sulfuric acid solution. The latex was slowly added to the coagulation solution under rapid stirring. During the addition of latex, the pH was maintained between 3 and 4. After coagulation the crumb polymer was washed 3 times with RO water and placed in a 150 F oven for 18 hours to dry.

FIG. 1 is an atomic force microscope image taken in tapping mode of the CS particles dispersed on a surface from hexane. The image shows the hard polystyrene cores surrounded by a soft polybutadiene matrix.

TABLE 4

| Example | Description |
| --- | --- |
| 1 | 27.9 phr CS Particle/77.1 phr SBR |
| 2 | 55.9 phr CS Particle/54.1 phr SBR |
| 3 | 121.8 phr CS Particle/0 phr SBR |
| 4 | 21.8 phr Core Particle/100 phr SBR |

Note: SBR is a random emulsion polymer containing about 23.5% styrene and 76.5% butadiene.

Tables 4 and 5 list the compositions of the compounds made. A series of compounds were made containing 0 phr–121.8 phr Core-shell (CS) in examples 1 to 3 to show the correlation between an increase in the amount of CS particles and the material properties, along with a control, namely example 4. The CS Particle was treated as 18% non-reactive to sulfur cure polystyrene and 82% reactive to sulfur cure polybutadiene so that each composition was considered to contain 100 parts rubber and the amount of curatives used were adjusted accordingly. Example 4 is a composition that contains only the polystyrene core of the CS Particle to determine the properties of the compound without the polybutadiene shell.

TABLE 5

|  | 1 | 2 | 3 | 4 |
| --- | --- | --- | --- | --- |
| Non-Productive |  |  |  |  |
| SBR (phr) | 77.1 | 54.1 | 0 | 100 |
| CS Particle (phr) | 27.9 | 55.9 | 121.8 | 0 |
| C Particle (phr) | 0 | 0 | 0 | 21.8 |
| Zinc Oxide (phr) | 3 | 3 | 3 | 3 |
| Steric acid (phr) | 1 | 1 | 1 | 1 |
| Total (phr) | 109 | 114 | 125.8 | 125.8 |
| Productive |  |  |  |  |
| Non-Productive | 109 | 114 | 125.8 | 125.8 |
| Sulfur | 1.75 | 1.75 | 1.75 | 1.75 |
| Santocure NS | 1 | 1 | 1 | 1 |
| TBBS accelerator |  |  |  |  |
| Total (phr) | 111.75 | 116.75 | 128.55 | 128.55 |

\* Non-productive is the compounded material without any curative agents added. The material may be heated and mixed to higher temperatures without beginning the vulcanization process. Productive is the non-productive material with the curative added. The material may now be cured (vulcanized) with heat.

Mixing Protocol

Mixing of the resin/polymer blends was accomplished in two stages. The first stage (Non-productive) involved adding half of the resin/polymer blend to a 55 cc Haake Rheomix 90 equipped with a throat, with all the temperature control zones set at 145° C., Banbury rotors, and a mixing rate of 50 rpm. After the first half of the blend is added to the mixer the other ingredients of the Non-productive are added. As soon as the Non-productive ingredients were added, the second half of the blend was added in order to clear the throat of any remaining material. The ram was lowered and the material was mixed for 6 minutes ensuring that the temperature did not exceed 170° C.

The productive mix was run under the same conditions except that the temperature zones of the mixer were controlled at 100° C. One-half of the mixed Non-productive material was added to the mixer followed by the productive ingredients, and the second half of the Non-productive. The ram was lowered and the material was mixed for 3 minutes with the temperature not to exceed 115° C.

After the Productive mix was completed, the samples were passed six times endwise through a mill set at 0.032 in. in order to create a sheet.

RPA TEST

The compounds were milled to provide a sheet of the material. Approximately 5 g (5.1±0.1 g.) of the compound were cut from the sheet. The test is divided up into four subtests. The first subtest was conducted at 100° C. with a 2% strain deformation at 0.333 Hz and 3.33 Hz. The second subtest was also made at 100° C. and employed a 15% strain at 0.833 and 8.33 Hz. The third subtest is a cure at 191° C. for a run time of 4.88 minutes. The cure curve is generated for a strain of 3.5% at a frequency of 1.667 Hz. Subtest 4 is a strain sweep (1.0%, 5.0%, 10.0%, 15.0%, and 50.0%) at 100° C. and 1.0 Hz.

TABLE 6

| RPA 505 | 1 | 2 | 3 | 4 |
|---|---|---|---|---|
| G' @ 15% Strain (0.833 Hz) - kPa | 123.5 | 171.5 | 295.3 | 120.9 |
| G' @ 10% Strain (1 Hz) - kPa | 561.7 | 654.8 | 842.1 | 727.3 |
| Tan δ @ 10% Strain (1 Hz) | 0.066 | 0.065 | 0.074 | 0.123 |
| Ratio of G' @ 50%/G' @ 1% Strain | 0.904 | 0.899 | 0.878 | 0.630 |

Table 6 shows the G' for the compounds at 15% strain and 10% strain along with the tan δ values at 10% strain. As the data indicate, the G' values increase as the amount of CS Particles are increased showing that the polymer particles are behaving as a filler. The data also show that there is a synergistic effect by having the shell on the core particle rather than the core alone. The core alone does not perform as well as the CS Particle.

In addition to the examples provided above, the shell can be formed of compositions that are uniquely tailored to provide desired compatibility with the polymer matrix of interest. The improved dispersability within the polymer matrix allows a lower quantity of core-shell particles than other known fillers to achieve desirable results. In addition, the density of the core-shell particles is less than 1 as compared to a filler such as carbon black with a density greater than 1. The use of the core-shell of the present invention provides improved performance as a reinforcing filler.

The core-shell particles of the present invention are applicable in a wide range of uses where the high modulus core enclosed in the readily miscible shell would impart superior qualities to a polymer matrix. The core-shell particles remain discrete in the polymer matrix due to the increased surface area provided by the shell. The particles may also be used to create polymer compositions with multiple, distinct $T_g$'s instead of a single weight averaged $T_g$ as obtained with standard polymer blends.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which would be within the full intended scope of the invention as defined by the following appended claims.

What we claim is:

1. A polymeric particle comprising:
    (a) a polymeric core, the core comprising repeat units comprised of styrene; and,
    (b) a polymeric shell, the shell comprising repeat units comprised of 1,3-butadiene wherein the polymeric particle has a particle diameter of less than about 240 nm.

2. The polymeric particle of claim 1 wherein the polymeric core is copolymerized styrene and butadiene.

3. The polymeric particle of claim 2 wherein the styrene is about 70 to 100% and the butadiene is about 0 to 30%.

4. The polymeric particle of claim 3 wherein the core includes an outer surface and, wherein the shell is grafted to the outer surface.

5. The polymeric particle of claim 4 wherein the shell is 1,3-butadiene and styrene.

6. The polymeric particle of claim 5 wherein the core is about 70 to 85% styrene and about 15 to 30% butadiene and the shell is about 20 to 30% styrene and about 70 to 80% butadiene.

7. The polymeric particle of claim 6 wherein the core is about 70 to 85% styrene and about 15 to 30% butadiene and the shell is 23.5% styrene and 76.5% butadiene.

8. A method of forming a polymeric particle comprising the steps of:
    (a) emulsion polymerizing styrene and about 0% to 100% by weight of 1,3-butadiene, and crosslinking divinyl benzene to create a crosslinked polymeric core having residual vinyl groups;
    (b) emulsion polymerizing 1,3-butadiene in the presence of the core to create a crosslinked polymeric shell; and,
    (c) grafting the polymeric shell to the polymeric core through covalently bonding of the polymeric shell with the residual vinyl groups of the polymeric core.

9. A method of forming a polymeric particle comprising the step of:
    emulsion polymerizing styrene to create a crosslinked polymeric core having residual vinyl groups;
    emulsion polymerizing 1,3-butadiene in the presence of the core to create a crosslinked polymeric shell; and,
    grafting the polymeric shell to the polymeric core through covalently bonding of the polymeric shell with the residual vinyl groups of the polymeric core.

10. The method of claim 9, wherein emulsion polymerizing styrene to create a crosslinked polymeric core having residual vinyl groups further comprises the step of:
    emulsion polymerizing styrene and butadiene to create a crosslinked polymeric core having residual vinyl groups.

11. The method of claim 10, wherein emulsion polymerizing styrene and butadiene to create a crosslinked polymeric core having residual vinyl groups further comprises the step of:

emulsion copolymerizing styrene and butadiene to create a crosslinked polymeric core having residual vinyl groups.

12. The method of claim 11, wherein emulsion copolymerizing styrene and butadiene to create a crosslinked polymeric core having residual vinyl groups further comprises the step of:

emulsion copolymerizing about 70 to 100% styrene and about 0 to 30% butadiene to create a crosslinked polymeric core having residual vinyl groups.

13. The method of claim 12, wherein emulsion copolymerizing about 70 to 100% styrene and about 0 to 30% butadiene to create a crosslinked polymeric core having residual vinyl groups further comprises the step of:

emulsion copolymerizing about 70 to 85% styrene and about 15 to 30% butadiene to create a crosslinked polymeric core having residual vinyl groups.

14. The method of claim 9, wherein emulsion polymerizing 1,3-butadiene in the presence of the core to create a crosslinked polymeric shell further comprises the step of:

emulsion copolymerizing styrene and 1,3-butadiene in the presence of the core to create a crosslinked polymeric shell.

15. The method of claim 14, wherein emulsion copolymerizing styrene and 1,3-butadiene in the presence of the core to create a crosslinked polymeric shell further comprises the step of:

emulsion copolymerizing 23.5% styrene and 76.5% 1,3-butadiene in the presence of the core to create a crosslinked polymeric shell.

16. The method of claim 13, wherein emulsion polymerizing 1,3-butadiene in the presence of the core to create a crosslinked polymeric shell further comprises the step of:

emulsion copolymerizing styrene and 1,3-butadiene in the presence of the core to create a crosslinlked polymeric shell.

17. The method of claim 16, wherein emulsion copolymerizing styrene and 1,3-butadiene in the presence of the core to create a crosslinked polymeric shell further comprises the step of:

emulsion copolymerizing 23.5% styrene and 76.5% 1,3-butadiene in the presence of the core to create a crosslinked polymeric shell.

18. The method of claim 9, wherein the method further comprises the step of:

crosslinking divinyl benzene with the styrene to create a crosslinked polymeric core.

19. The method of claim 13, wherein the method further comprises the step of:

crosslinking divinyl benzene with the styrene to create a crosslinked polymeric core.

20. The method of claim 14, wherein the method further comprises the step of:

crosslinking divinyl benzene with the styrene to create a crosslinked polymeric core.

21. The method of claim 16, wherein the method further comprises the step of:

crosslinking divinyl benzene with the styrene to create a crosslinked polymeric core.

22. A method of forming a polymeric particle comprising the step of:

emulsion polymerizing butadiene to create a crosslinked polymeric core having residual vinyl groups;

emulsion polymerizing 1,3-butadiene in the presence of the core to create a crosslinked polymeric shell; and, grafting the polymeric shell to the polymeric core through covalently bonding of the polymeric shell with the residual vinyl groups of the polymeric core.

23. The method of claim 22, wherein the method further comprises the step of:

crosslinking divinyl benzene with the butadiene to create a crosslinked polymeric core.

\* \* \* \* \*